United States Patent [19]

Leti et al.

[11] 4,351,020
[45] Sep. 21, 1982

[54] CIRCUIT ARRANGEMENT FOR EQUALIZING WAVEFORMS OF PUSH-PULL POWER SUPPLY

[75] Inventors: Andrea Leti, Sesto S. Giovanni; Enrico Valacca, Pavia, both of Italy

[73] Assignee: Italtel Societa Italiana Telecomunicazioni S.p.A., Milan, Italy

[21] Appl. No.: 247,643

[22] Filed: Mar. 26, 1981

[30] Foreign Application Priority Data

Mar. 28, 1980 [IT] Italy .............................. 20996 A/80

[51] Int. Cl.³ .......................................... H02P 13/20
[52] U.S. Cl. ...................................... 363/26; 363/97; 363/134
[58] Field of Search ................................... 363/22–27, 363/56, 97, 133, 134

[56] References Cited

U.S. PATENT DOCUMENTS

| | | |
|---|---|---|
| 3,873,903 | 3/1975 | Koetsch et al. .................. 363/25 X |
| 4,150,424 | 4/1979 | Nuechterlein ........................ 363/26 |
| 4,150,426 | 4/1979 | Jansson .............................. 363/25 X |
| 4,162,524 | 7/1979 | Jansson ................................. 363/56 |
| 4,233,658 | 11/1980 | Lupatin et al. ........................ 363/26 |

Primary Examiner—A. D. Pellinen
Attorney, Agent, or Firm—Karl F. Ross

[57] ABSTRACT

Two power transistors operating in push-pull, connected in series with respective halves of a transformer primary across a d-c source, are alternately rendered conductive by driving pulses generated during fractions of corresponding half-cycles of a square-wave oscillator. Two integrating networks, connected across these primary halves or across resistors in series therewith, work into a comparator whose output signal, reflecting a dissymmetry between the transistor currents, unbalances the square-wave oscillator to vary the relative width of the two sets of driving pulses until the dissymmetry substantially disappears.

7 Claims, 8 Drawing Figures

CIRCUIT ARRANGEMENT FOR EQUALIZING WAVEFORMS OF PUSH-PULL POWER SUPPLY

FIELD OF THE INVENTION

Our present invention relates to a circuit arrangement for generating two alternating sets of load-energizing pulses of equal power, such as waveforms appearing in respective half-cycles of the primary current of an output transformer forming part of a push-pull power supply.

BACKGROUND OF THE INVENTION

A power supply of the type referred to comprises two substantially identical transistors each having two main electrodes and a control electrode; with junction-type transistors, in particular, the main electrodes are a collector and an emitter while the control electrode is a base. One main electrode of each power transistor, usually the emitter, is connected to a first terminal of a source of direct current which has a second terminal connected by way of respective circuit branches to the other main electrode of each transistor, i.e. to the collector in the specific instance here considered. Each of these circuit branches includes a primary transformer winding associated with a load-energizing secondary winding; the two primary windings are wound on a common core and may therefore be considered respective halves of a common primary.

When the two power transistors are made alternately conductive by driving pulses applied to their control electrodes (bases), the transformer secondary carries an alternating current which upon rectification and filtering gives rise to a direct load current whose magnitude depends on the energy drawn from the source during alternate half-cycles. The amount of this energy, in turn, is determined by the duration of the respective driving pulses. Thus, a desired ratio of load voltage to source voltage can be established by making the duration of each driving pulse equal to a selected fraction of a half-cycle.

If the two primary windings are part of separate output transformers with individual secondary windings, the currents generated in these secondaries can be independently filtered to produce a pair of load voltages of opposite polarities. It is also possible to utilize the pulsating currents of these secondaries as a pair of interleaved pulse trains of like or opposite polarity energizing respective loads without prior filtering.

In all these instances it is often important to equalize the waveforms alternately traversing the two primary windings which, despite the use of two substantially identical power transistors, may significantly differ from each other in the presence of driving pulses of like duration. Thus, the collector current of one transistor may not have the same average value as that of the other transistor; a reason for such a dissymmetry of the two waveforms is the so-called storage time, due to an accumulation of minority carriers, which delays the cutoff of a transistor beyond the termination of a driving pulse applied to its base. This storage time, in fact, can vary considerably from one transistor to the next.

In the case here particularly envisaged, where the two windings are part of a common output transformer, any unbalance between positive and negative half-cycles of the primary current will shift the operating range of the transformer core toward one or the other end of its hysteresis loop whereby the secondary current will be distorted.

OBJECTS OF THE INVENTION

The general object of our present invention, therefore, is to provide a circuit arrangement of the type referred to having means for equalizing the waveforms of two components delivered by a pair of alternately conducting transistors.

A more particular object is to provide a push-pull power supply of this character whose output transformer is alternately driven by currents of opposite polarities having identical waveforms to generate a balanced secondary current.

SUMMARY OF THE INVENTION

We realize these objects, in accordance with our present invention, by the provision of sensing means connected to the circuit branches including the two primary windings of producing a pair of measuring variables, such as capacitor charges, which are respectively proportional to the mean current flow through these windings. A comparator with inputs connected to the sensing means emits an error signal which is representative in sign and magnitude of any difference between these measuring variables and which is fed to a control input of circuitry generating the interleaved trains of driving pulses for varying the relative width thereof in a sense tending to reduce the error signal substantially to zero.

The sensing means may comprise a pair of integrating networks each connected either across the corresponding primary winding or across a resistor in series therewith. The pulse-generating circuitry advantageously comprises a square-wave oscillator adapted to produce an unsymmetrical waveform in response to that error signal, the oscillator driving one or two sawtooth generators producing two triangular pulses during each square-wave cycle. The driving pulses for the control electrodes of the two power transistors are generated whenever these two triangular pulses respectively surpass a predetermined reference level.

BRIEF DESCRIPTION OF THE DRAWING

The above and other features of our present invention will now be described in detail with reference to the accompanying drawing in which.

SPECIFIC DESCRIPTION

Figure 1:
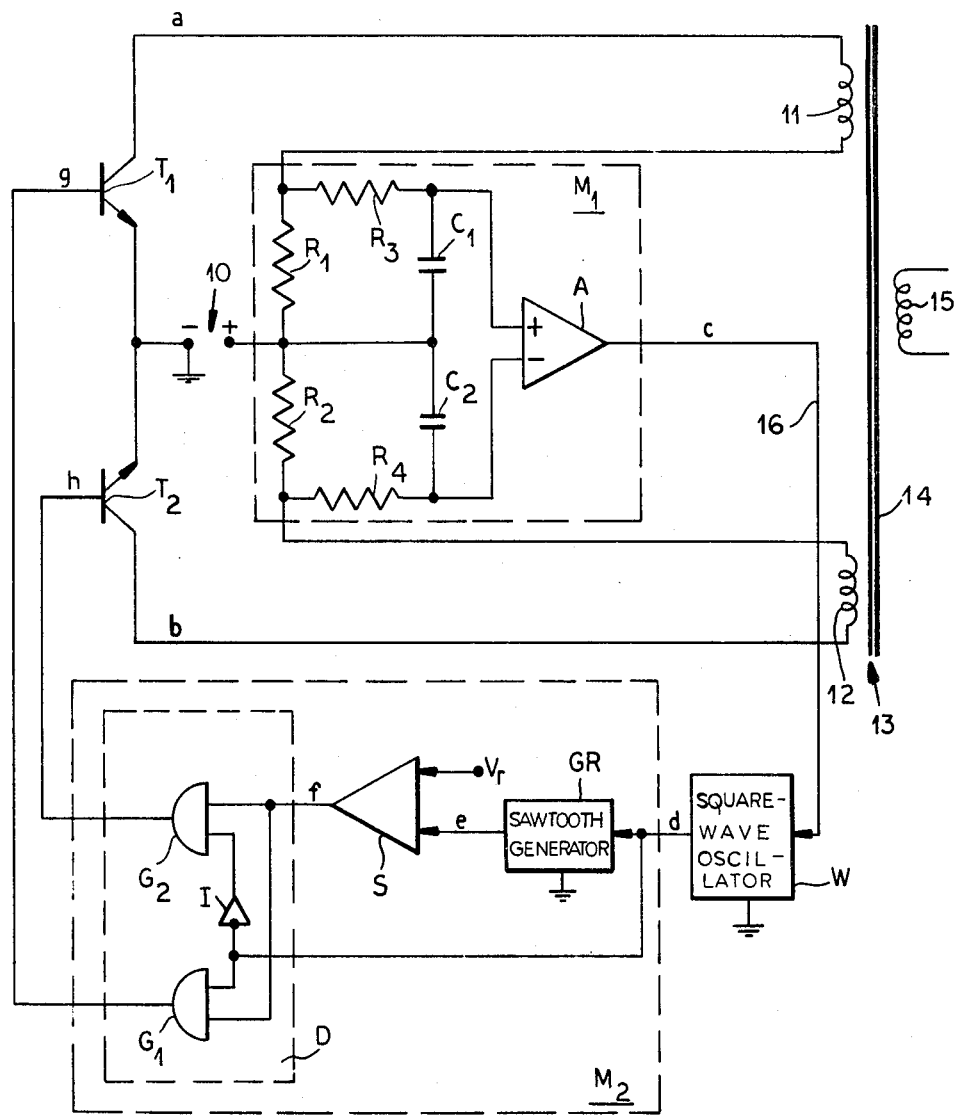
FIG. 1 is a circuit diagram of a push-pull power supply embodying our invention.

In FIG. 1 we have diagrammatically shown a d-c source 10 with a grounded negative terminal connected to the emitters of two NPN transistors $T_1$, $T_2$ and with a positive terminal connected to the collectors of these transistors by way of respective circuit branches including resistors $R_1$, $R_2$ in series with primary windings 11, 12 of an output transformer 13 with a common core 14 and a secondary winding 15. A sensing circuit $M_1$ comprises two integrating networks with resistors $R_3$, $R_4$ and capacitors $C_1$, $C_2$ respectively connected across resistors $R_1$ and $R_2$. The plates of capacitors $C_1$ and $C_2$ remote from the positive source terminal are connected to respective inputs of a comparator A which has an output lead 16 connected to a control input of a square-wave oscillator W. The latter drives a sawtooth-voltage generator GR which works into one input of a threshold comparator S having another input tied to a source of predetermined but preferably adjustable reference voltage $V_r$. The output of threshold comparator S is connected by way of a distributing network D, including a pair of AND gates $G_1$ and $G_2$, to the bases of transistors $T_1$ and $T_2$. Each of gates $G_1$ and $G_2$ has one input tied to the output of comparator S and another input connected to the output of oscillator W, with interposition of an inverter I in the case of gate $G_2$. Sawtooth generator GR, threshold comparator S and distributing network D form part of a pulse-generating circuit $M_2$.

The operation of the circuit arrangement of FIG. 1 will now be described with reference to the several graphs of FIGS. 2 and 3. The collector currents of transistors $T_1$ and $T_2$, traversing primary windings 11 and 12, have been designated a and b, respectively. An error signal c (not shown in FIGS. 2 and 3) emitted by comparator A on lead 16, in the event of a dissymmetry between currents a and b, unbalances the square-wave oscillator W which in the absence of such an error signal generates a binary voltage d alternating for identical periods between a high and a low level. Such an oscillator may be designed, for example, as an astable multivibrator with a pair of RC networks whose time constants are inversely modified by ancillary transistors biased into greater or lesser conductivity by an error signal of one or the other polarity. Sawtooth generator GR produces a ramp voltage which returns to zero whenever the square wave d from oscillator W changes its level. The resulting triangular pulses e are compared in device S with reference voltage $V_r$ and give rise to a control pulse f which clears the gate $G_1$ when voltage d is high to produce a driving pulse g for the base of transistor $T_1$; when square wave d is low, gate $G_2$ conducts to deliver a driving pulse h to the base of transistor $T_2$.

Figure 2:
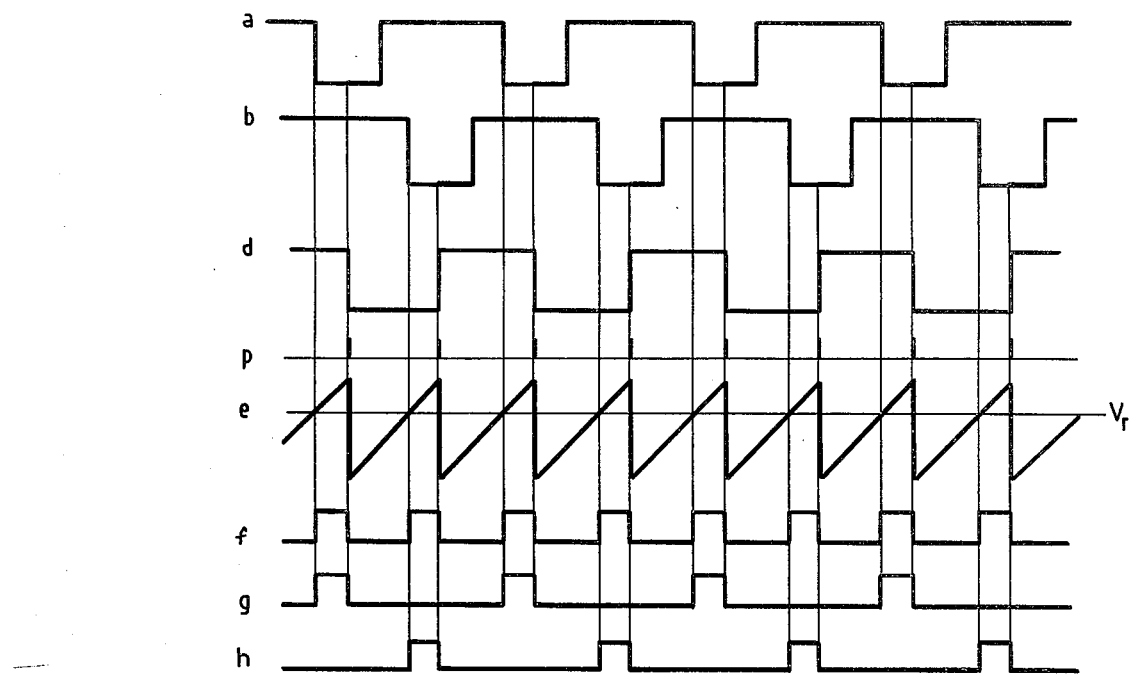
FIGS. 2 and 3 are graphs showing waveforms occurring in the circuit arrangement of FIG. 1 with transistors of identical and different operating characteristics, respectively.

The graphs of FIG. 2 relate to the case where no error signal appears on lead 16 so that square wave d is balanced. Unipolar spikes p, derived from that square wave within sawtooth generator GR by differentiation of the square wave and subsequent rectification, thus occur at constant intervals coinciding with the rising and falling flanks thereof to discharge a storage capacitor in the generator so that sawtooth wave e consists of uniform triangular pulses coinciding with the half-cycles of the square wave. Whenever the ramp voltage of this sawtooth wave surpasses the reference level $V_r$, a control pulse f is generated; under these conditions, all the control pulses and the resulting gating pulses g and h are of uniform width.

As indicated in the first two graphs of FIG. 2, collector currents a and b are composed of pulses (here arbitrarily shown as of negative polarity) which are also of constant width exceeding the duration of driving pulses g and h by identical storage periods marked by heavier lines.

Figure 3:
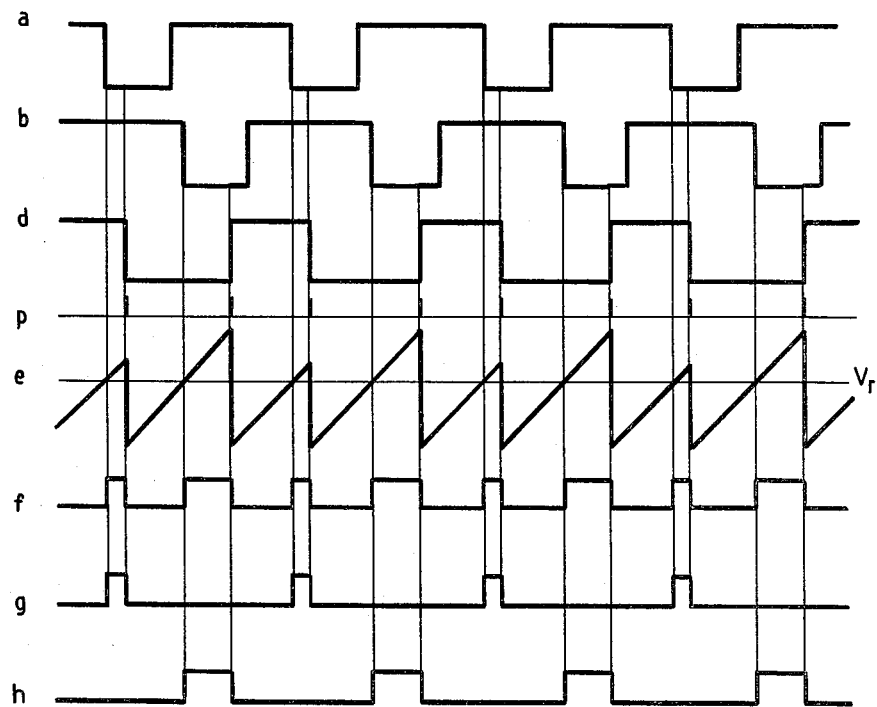

FIG. 3 represents the case where, in contrast to the situation assumed in FIG. 2, the storage periods of transistors $T_1$ and $T_2$ are significantly different so that collector currents a and b would have different waveforms if driving pulses g and h had the same uniform width as in the preceding Figure. More particularly, the storage period of transistor $T_1$ is here shown to exceed that of transistor $T_2$. Owing to the error signal c appearing on lead 16 of FIG. 1 as long as such a dissymmetry charges capacitors $C_1$ and $C_2$ to different voltage levels, square wave d is unbalanced so that its low-level periods last longer than its high-level periods. (If transistor $T_2$ had the greater storage period, voltage d would dwell longer on its upper than on its lower level.) Spikes p generated in sawtooth oscillator GR thus have an uneven spacing which results in alternately lower and higher triangular pulses in sawtooth wave e. With reference voltage $V_r$ unchanged from the previous instance, driving pulses q are substantially narrower than driving pulses h to compensate for the difference in storage periods whereby, again, the waveforms of currents a and b are maintained substantially identical.

Figure 4:
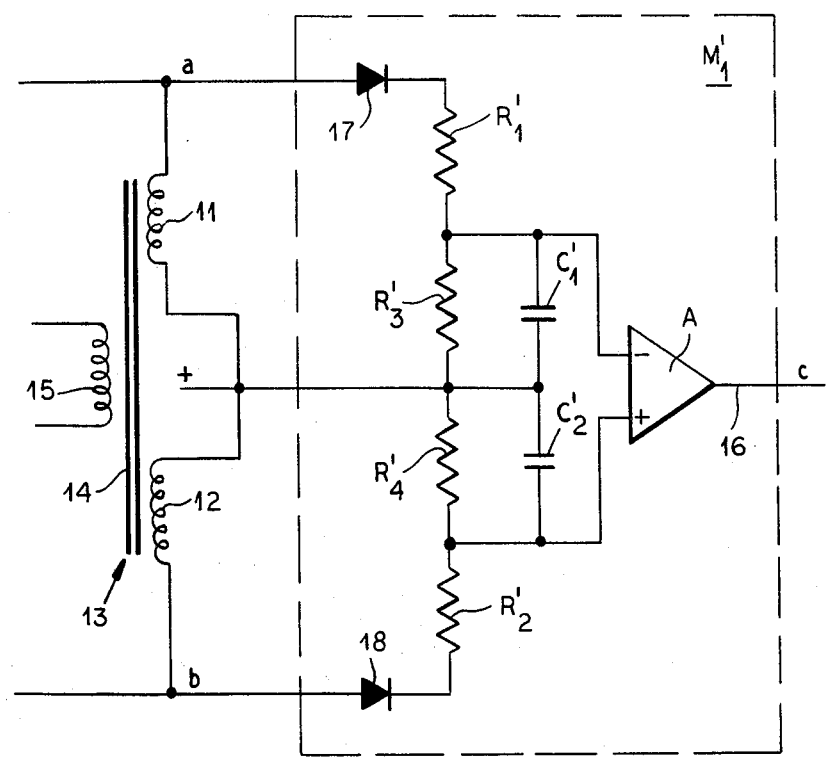
FIG. 4 illustrates a partial modification of a sensing circuit included in the power supply of FIG. 1.

As shown in FIG. 4, a modified sensing circuit $M_1'$ comprises two integrating networks with resistors $R_1'$, $R_3'$ and $R_2'$, $R_4'$ in series, resistors $R_3'$ and $R_4'$ being shunted by respective capacitors $C_1'$ and $C_2'$. Each of these networks is connected across one of the two primary windings 11 and 12 of transformer 13 by way of a respective diode 17, 18 so poled that capacitors $C_1'$ and $C_2'$ charge only when the corresponding transistor is cut off. The additive and subtractive inputs of comparator A, which in FIG. 1 are respectively connected to capacitors $C_1$ and $C_2$, have been switched in FIG. 4 so that error signal c on output lead 16 is of the same polarity as before when, say, transistor $T_1$ conducts longer than transistor $T_2$. Thus, the mode of operation is unchanged when circuit $M_1'$ is associated with circuit $M_2$ of FIG. 1.

Figures 5, 8:
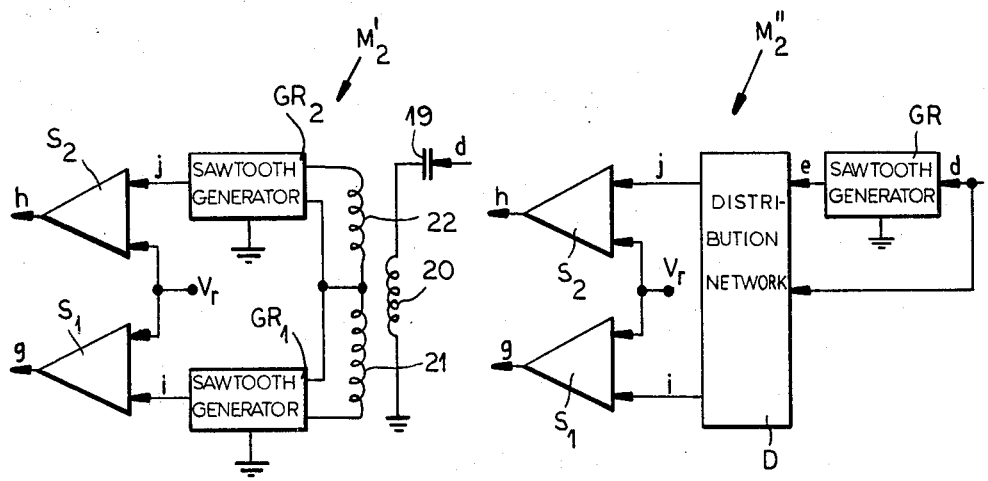
FIG. 5 shows a modification of a pulse-generating circuit forming part of that power supply.
FIG. 8 is a diagram similar to FIG. 5, illustrating a further modification.

In FIG. 5 we have shown a slightly different pulse-generating circuit $M_2'$ in which the square wave d from oscillator W (FIG. 1) passes via a coupling capacitor 19 to the primary 20 of an ancillary transformer whose secondary is split into two halves 21 and 22 respectively working into a pair of sawtooth-voltage generators $GR_1$ and $GR_2$. The latter feed respective threshold comparators $S_1$ and $S_2$ which receive the reference voltage $V_r$ and supply the driving pulses g and h for transistors $T_1$ and $T_2$ of FIG. 1.

Figure 6:
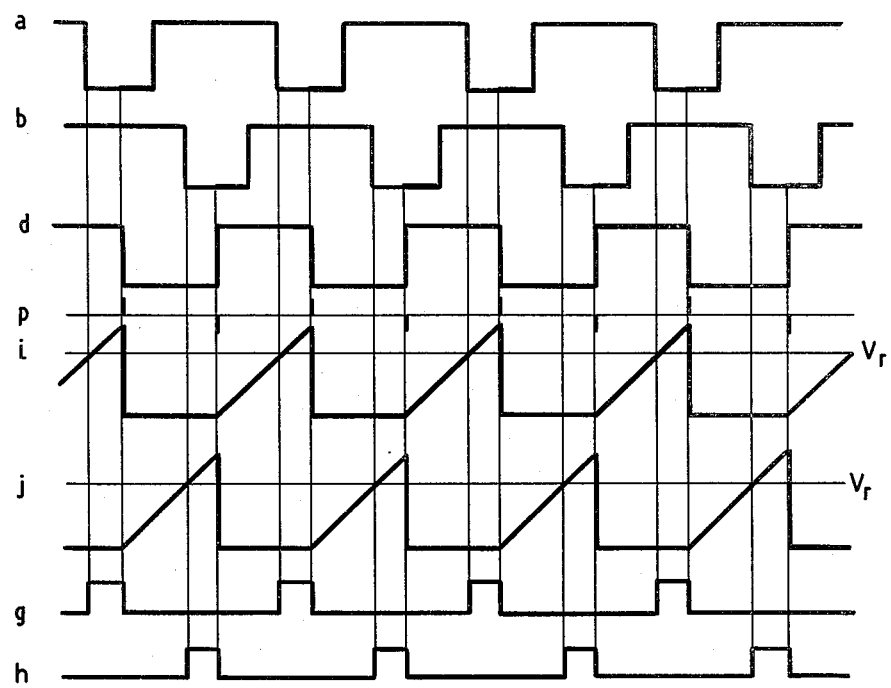
FIGS. 6 and 7 are graphs similar to those of FIGS. 2 and 3 but relating to the modification of FIG. 5.
Figure 7:
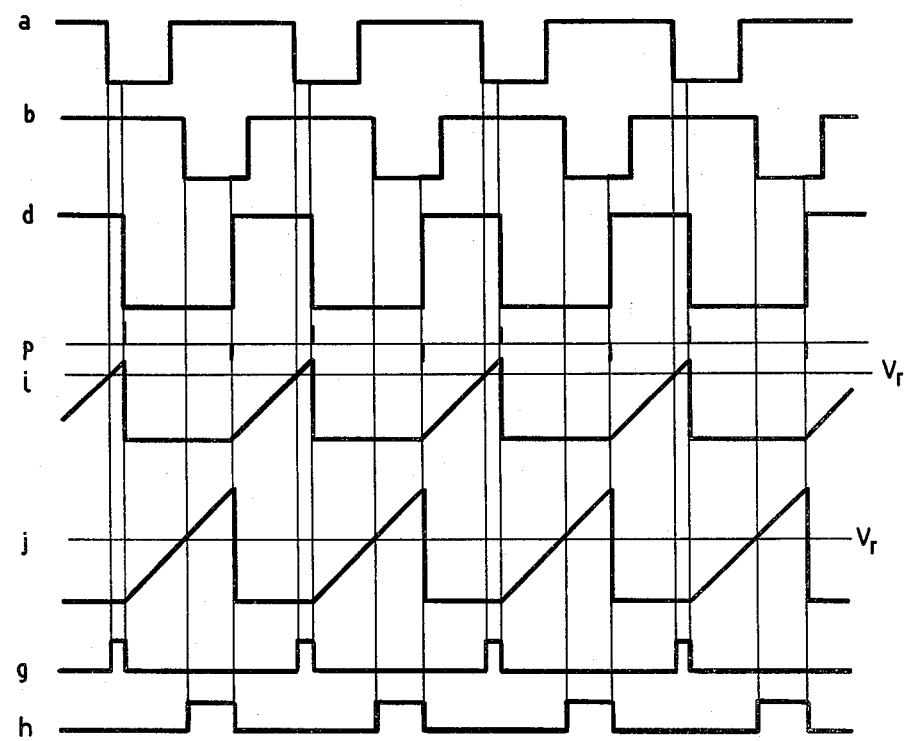

As shown in FIGS. 6 and 7, generators $GR_1$ and $GR_2$ produce two overlapping sawtooth waves i and j respectively giving rise to driving pulses g and h upon surpassing the reference level $V_r$. In FIG. 6, as in FIG. 2 described above, the two transistors are assumed to have identical storage periods again marked by heavier lines so that square wave d is balanced and the two sawtooth waves i and j comprise identical pulses 180° out of phase. Spikes p are again derived from wave d by differentiation, inside each sawtooth generator $GR_1$ and $GR_2$, but are not rectified in this instance so as to appear alternately of positive and negative polarity. Generator $GR_1$ starts the ramp voltage of each sawtooth of wave i in response to a negative spike and ends it in response to a positive spike whereas generator $GR_2$ operates in the opposite manner to produce the wave j.

In FIG. 7, as in FIG. 3, transistor $T_1$ is assumed to have a longer storage period than its mate $T_2$ whereby an error signal c emitted by comparator A of FIG. 1 or 4 unbalances the square wave d with the result that spikes p again occur at nonuniform intervals to produce sawteeth with ramp voltages of different duration in waves i and j. Thus, driving pulses g and h are of different widths compensating for the disparity in the storage periods of the two transistors.

FIG. 8 illustrates a further pulse-generating circuit $M_2''$ with a single sawtooth generator GR as in FIG. 1 and two threshold comparators $S_1$, $S_2$ as in FIG. 5, these comparators being separated from generator GR by a distribution network D similar to that shown in FIG. 1. At least in this instance, however, gates $G_1$ and $G_2$ of network D must be of analog rather than binary type in order to pass alternate triangular pulses of sawtooth wave e. Circuit $M_2''$, like circuits $M_2$ and $M_2'$, can of course be used with either of the two sensing circuits $M_1$ and $M_1'$ shown in FIGS. 1 and 4.

While FIGS. 1 and 4 show windings 11 and 12 as part of a common primary of a single output transformer 13 with one secondary 15, it will be apparent that these windings could also be part of two separate transformers with individual secondaries. Any of these secondaries may be connected to another integrating network for the energization of a load with direct current, yet our invention is also applicable to systems in which the pulsating secondary currents are used without integration or smoothing. In any event, the output energy of our improved power supply can be widely varied (up to the maximum available from source 10) by a suitable choice of reference voltage $V_r$.

With the use of a single transformer having both windings 11 and 12 wound on a common core 14, as shown in FIGS. 1 and 4, the maintenance of identical waveforms in the currents flowing through these windings with opposite polarities insures a symmetrical traverse of the hysteresis loop of that core so that distortion of the secondary current is prevented.

We claim:

1. A circuit arrangement for generating two alternating sets of load-energizing pulses of equal power, comprising:
    two substantially identical transistors each having two main electrodes and a control electrode, one main electrode of each transistor being connected to a first terminal of a source of direct current having a second terminal connected by way of respective circuit branches to the other main electrode of each transistor, each of said circuit branches including a primary winding forming part of transformer means provided with at least one secondary winding for energizing a load;
    pulse-generating circuitry with a pair of output leads connected to the control electrodes of said transistors for respectively delivering thereto two interleaved trains of first and second driving pulses of substantially constant recurrence frequency and of a width less than a half-cycle of said recurrence frequency whereby said transistors alternately conduct and energize said primary windings fractions of respective half-cycles;
    sensing means for producing a pair of measuring variables respectively proportional to the mean current flow through said primary windings, said sensing means including two capacitors each connected in series with a respective resistor across at least part of one of said circuit branches; and
    comparison means with inputs connected to said capacitors for emitting on error signal representative in sign and magnitude to any difference between said measuring variables, said pulse-generating circuitry having a control input connected to said comparison means for varying the relative width of said first and second driving pulses in a sense tending to reduce said error signal to substantially zero, said pulse-generating circuitry including a square-wave oscillator having a control input connected to said comparison means for producing an unsymmetrical waveform in response to said error signal.

2. A circuit arrangement for generating two alternating sets of load-energizing pulses of equal power, comprising:
    two substantially identical transistors each having two main electrodes and a control electrode, one main electrode of each transistor being connected to a first terminal of a source of direct current having a second terminal connected by way of respective circuit branches to the other main electrode of each transistor, each of said circuit branches including a primary winding forming part of transformer means provided with at least one secondary winding for energizing a load;
    pulse-generating circuitry with a pair of output leads connected to the control electrodes of said transistors for respectively delivering thereto two interleaved trains of first and second driving pulses of substantially constant recurrence frequency and of a width less than a half-cycle of said recurrence frequency whereby said transistors alternately conduct and energize said primary windings during fractions of respective half-cycles;
    sensing means for producing a pair of measuring variables respectively proportional to the mean current flow through said primary windings, said sensing means including a pair of integrating networks each connected in series with a respective diode across one of said primary windings; and
    comparison means with inputs connected to said sensing means for emitting an error signal representative in sign and magnitude to any difference between said measuring variables, said pulse-generating circuitry having a control input connected to said comparison means for varying the relative width of said first and second driving pulses in a sense tending to reduce said error signal to substantially zero.

3. A circuit arrangement as defined in claim 1 or 2 wherein said transformer means has a common core carrying said primary windings.

4. A circuit arrangement as defined in claim 1 wherein said circuit branches include respective resistors in series with said primary windings, said sensing means comprising a pair of integrating networks respectively connected across said resistors.

5. A circuit arrangement as defined in claim 1 wherein said capacitors are part of a pair of integrating networks connected in series with respective diodes across said primary windings.

6. A circuit arrangement as defined in claim 2 wherein said pulse-generating circuitry comprises a square-wave oscillator adapted to produce an unsymmetrical waveform in response to said error signal.

7. A circuit arrangement as defined in claim 1 or 6 wherein said pulse-generating circuitry further comprises sawtooth-generating means driven by said square-wave oscillator for producing first and second triangular pulses during each square-wave cycle and threshold means connected to said sawtooth-generating means for respectively producing said first and second driving pulses upon said first and second triangular pulses surpassing a predetermined reference level.

* * * * *